(12) United States Patent
Avila

(10) Patent No.: US 6,319,169 B1
(45) Date of Patent: Nov. 20, 2001

(54) MAGNETIC BRAKE FOR A TRANSMISSION LOCK

(75) Inventor: Miguel I. Avila, Juarez (MX)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/540,625

(22) Filed: Mar. 31, 2000

(51) Int. Cl.$^7$ .................................................. B60K 41/20
(52) U.S. Cl. ............................................. 477/94; 188/166
(58) Field of Search ........................ 477/94, 99; 188/166, 188/72.3, 72.1

(56) References Cited

U.S. PATENT DOCUMENTS

| | | | | |
|---|---|---|---|---|
| Re. 36,216 | * | 6/1999 | Telford ................................. | 254/375 |
| 2,075,991 | * | 4/1937 | Kessler ................................. | 188/130 |
| 2,308,966 | * | 1/1943 | Saurer ................................... | 188/130 |
| 3,994,379 | * | 11/1976 | Miller et al. ......................... | 192/111 A |
| 4,194,610 | * | 3/1980 | Miller .................................. | 192/111 A |
| 4,566,575 | * | 1/1986 | Sekella ................................ | 192/84 C |
| 5,035,156 | * | 7/1991 | Roble ................................... | 74/850 |
| 5,460,248 | * | 10/1995 | Korb et al. ........................... | 188/130 |
| 5,570,760 | * | 11/1996 | Lai ........................................ | 188/26 |

* cited by examiner

*Primary Examiner*—Dirk Wright
(74) *Attorney, Agent, or Firm*—Margaret A. Dobrowitsky

(57) ABSTRACT

A magnetic brake for a transmission lock includes a coil housing having a closed end, an open end, and a continuous side wall therebetween. A central post extends from the closed end of the housing and establishes an annular chamber between the central post and the side wall, and a coil surrounds the post. A frusto-conical brake plate seat circumscribes the open end of the housing. A brake plate has frusto-conical peripheral surface, and when the coil is energized, the surface engages the seat in an interference fit that is sufficiently tight to prevent the brake plate from being rotated relative to the housing. A spring washer is included to bias the brake plate from the locked position to the unlocked position.

11 Claims, 2 Drawing Sheets

MAGNETIC BRAKE FOR A TRANSMISSION LOCK

TECHNICAL FIELD

The present invention relates to electro-mechanical locking mechanisms for motor vehicle transmissions.

BACKGROUND OF THE INVENTION

Many vehicles available today are equipped with a safety mechanism that prevents an automatic transmission from being shifted into gear unless the driver is pressing the brake pedal. This safety feature prevents a vehicle from inadvertently being shifted into gear when the driver is out of the vehicle or when he or she is not yet ready to move.

As recognized by the present invention, a magnetic brake can be used to prevent a gear shift lever from rotating with respect to the locking device. A magnetic brake can include a coil package axially aligned with a disk-shaped plate. When the coil is energized, the plate is drawn into contact with the coil package and is held in place by the force of magnetic attraction therebetween. The magnetic brake provides a force that as a practical matter may not be overcome by a torque created on the magnetic brake by a driver attempting to place a vehicle in gear.

The present invention understands that in order to provide an axial force large enough to withstand the torque necessary to place a vehicle into gear, a relatively large coil package that uses substantial power when energized is undesirable because it is expensive and bulky.

The present invention has recognized these drawbacks, and has provided the below-disclosed solutions to one or more of the prior art deficiencies.

SUMMARY OF THE INVENTION

A magnetic brake for use in a vehicle transmission lock includes a housing that defines an axis and includes an end that is circumscribed by a seat that establishes an oblique angle relative to the axis. The magnetic brake further includes a plate with a peripheral surface that is complementarily shaped with the seat. The plate is movable between an unlocked position, wherein the plate is distanced from the housing and the plate is able to rotate with respect to the housing, and a locked position, wherein the perimeter surface of the plate engages the seat and the plate is unable to rotate with respect to the housing.

In a preferred embodiment, magnetic brake includes a coil disposed within the housing. The coil is energizable to move the plate from the unlocked position to the locked position. Additionally, the magnetic brake includes a spring washer that biases the plate toward the unlocked position. Preferably, the oblique angle between the seat and the axis is between ten degrees and fifteen degrees (10°–15°).

In another aspect of the present invention, an electro-mechanical transmission locking system includes a vehicle power supply, an ignition switch electrically coupled to the vehicle power supply, a brake pedal switch, a magnetic brake electrically coupled to the ignition switch and the brake pedal, a transmission shift lever mechanically coupled to the magnetic brake, and an automatic transmission mechanically coupled to the transmission shift lever. In this aspect of the present invention, the magnetic brake defines a frusto-conical locking interface.

In yet anther aspect of the present invention, a magnetic brake for use in an automatic transmission locking system includes a housing having a closed end, an open end, and a continuous side wall therebetween. A seat circumscribes the open end of the housing and a central post extends from the closed end of the housing and establishes an annular chamber between the central post and the side wall. This aspect of the magnetic brake also includes a plate that forms a perimeter surface for engaging the seat. The plate is movable between an unlocked position, wherein the plate is distanced from the housing and the plate is able to rotate with respect to the housing, and a locked position, wherein the perimeter surface of the plate engages the seat and the plate is unable to rotate with respect to the housing. Furthermore, the magnetic brake includes a coil that is disposed around the central post within the annular chamber. The coil is energizable to move the plate from the unlocked position to the locked position.

The present invention will now be described, by way of example, with reference to the accompanying drawings, in which:

DESCRIPTION OF AN EMBODIMENT OF THE INVENTION

Figure 1:
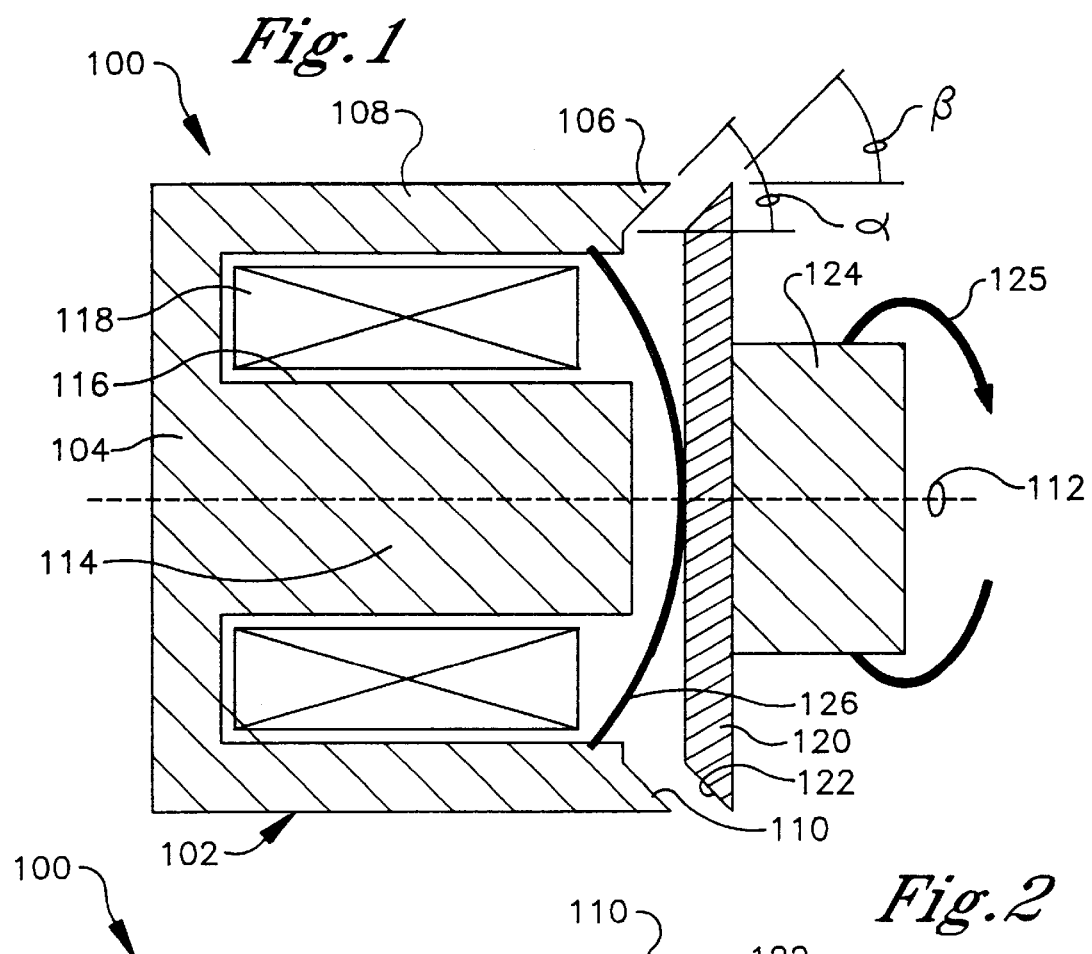
FIG. 1 is a cross-sectional view of the magnetic brake for a transmission lock in the unlocked position.

Referring initially to FIG. 1, a magnetic brake for a transmission lock is shown and generally designated 100. The magnetic brake 100 includes a preferably plastic, generally cylindrical coil housing 102 that has a generally E-shaped cross-section. Furthermore, the coil housing 102 includes a closed distal end 104, an open proximal end 106, and a generally cylindrical continuous side wall 108 therebetween.

As shown in FIG. 1, a brake plate seat 110 circumscribes the open proximal end 106 of the coil housing 102. The brake plate seat 110 is frusto-conical, and preferably, the seat 110 establishes a predetermined oblique angle with respect to a longitudinal axis 112 defined by the coil housing 102. The brake plate seat 110 is formed to receive a complementarily-shaped brake plate, described below. In a particularly preferred embodiment, the angle a is between ten and fifteen degrees (10°–15°).

FIG. 1 also shows that the coil housing 102 includes a solid, generally cylindrical central post 114 that extends inwardly from the closed distal end 104 of the coil housing 102. An annular chamber 116 is established between the continuous side wall 108 and the central post 114. A hollow toroidal coil 118 of wire is disposed within the annular chamber 116 and is wound around the central post 114.

Referring again to FIG. 1 and moving to the right side to continue the physical description of the magnetic brake 100, a preferably metal brake plate 120 is shown. The brake plate 120 is axially aligned with the coil housing 102 and is formed with a frusto-conical peripheral outer surface 122 that forms an angle b with respect to the longitudinal axis 112 of the coil housing 102. In a preferred embodiment, the angle b is equal to the angle a so that when the magnetic brake 100 is in the locked position, described below, the peripheral surface 122 of the brake plate 120 mates with the brake plate seat 110. Additionally, FIG. 1 shows that a shaft 124 is aligned with the coil housing 102 and is attached to the brake plate 120. In a preferred embodiment, the shaft 124 is made integrally with the brake plate 120 and is mechanically coupled to a shift lever, described below, that can be manipulated to torque the shaft 124 as indicated by the arrow 125.

Completing the description of FIG. 1, a spring washer 126 is installed in a convex configuration within the open proximal end 106 of the coil housing 102. As such, the spring washer 126 biases the brake plate toward the unlocked position as described in detail below.

Figure 3:
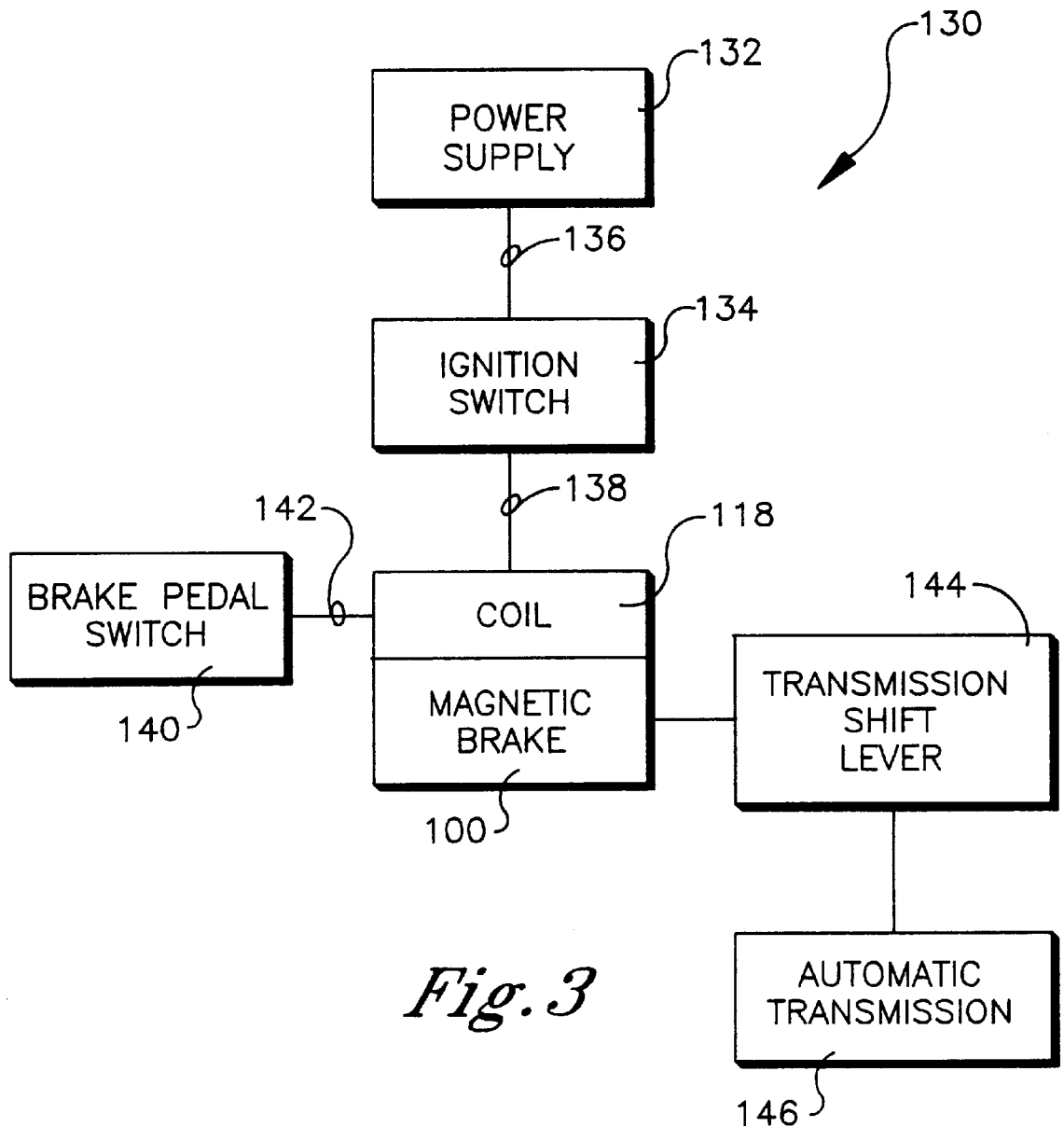
FIG. 3 is a block diagram representing a typical electro-mechanical transmission locking system.

Referring now to FIG. 3, an electro-mechanical transmission locking system that incorporates the magnetic brake 100 of the present invention is shown and generally designated 130. FIG. 3 shows that the locking system 130 includes a vehicle power supply 132 electrically coupled to an ignition switch 134 via an electrical line 136. The magnetic brake 100, more specifically the coil 118, is electrically coupled to the ignition switch 134 via an electrical line 138 and to a brake pedal depress switch 140 via an electrical line 142. FIG. 3 also shows that the magnetic brake 100 is mechanically coupled to a transmission shift lever 144 that, in turn, is mechanically coupled to an automatic transmission 146.

OPERATION

Initially, with the coil 118 de-energized, the magnetic brake 100 is in the unlocked position, as shown in FIG. 1. In the unlocked position, the force of the spring washer 126 causes the brake plate 120 to be distanced from the coil housing 102. In the unlocked position, the brake plate 120 is free to rotate with respect to the coil housing 102 and as such, the shaft 124 and anything connected to the shaft 124, such as the shift lever 144, is free to move with respect to the coil housing 102.

Figure 2:
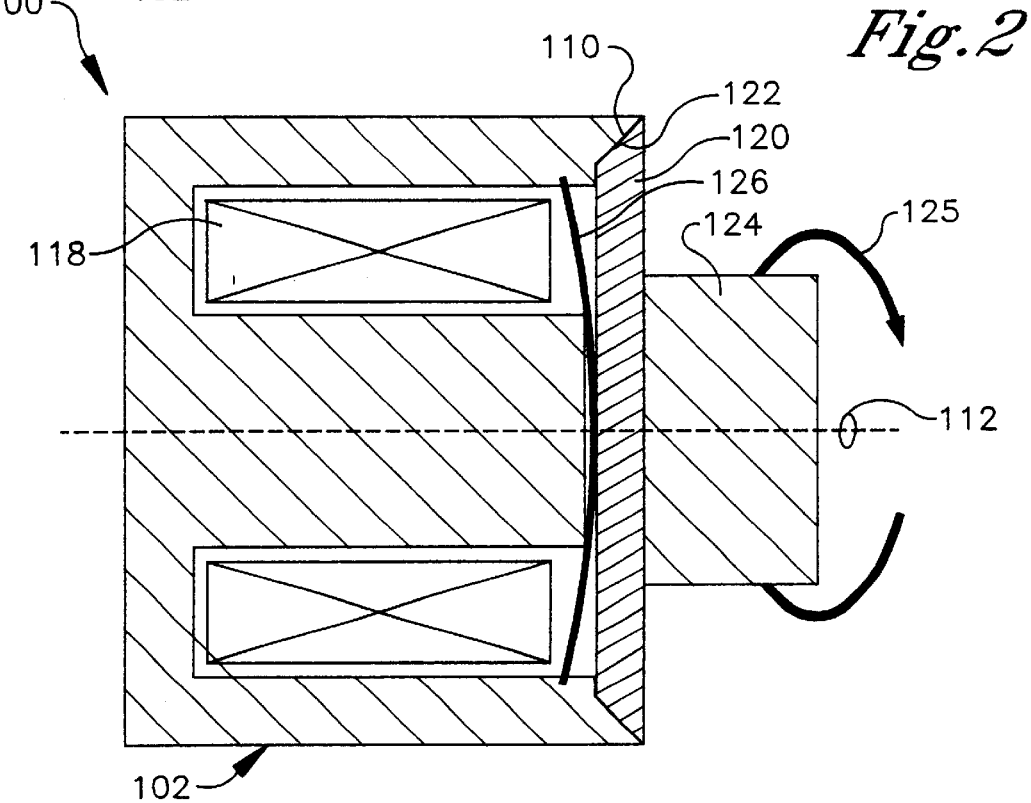
FIG. 2 is a cross-sectional view of the magnetic brake in the locked position.

If the vehicle ignition switch 134 is turned on and the brake pedal depress switch 140 is not activated, power is supplied to the coil 118 of the magnetic brake 100. When the coil 118 is energized, the magnetic brake 100 moves to the locked position, as shown by FIG. 2. In the locked position, the force of magnetic attraction between the coil 118 and the brake plate 120 overcomes the force of the spring washer 126 and the brake plate 120 moves into contact with the coil housing 102. In accordance with the preferred configuration, the conical perimeter surface 122 of the brake plate 120 engages the brake plate seat 110 formed in the coil housing 102.

The magnetic force created by the energized coil 118 and the friction between the brake plate 120 and the coil housing 102 prevent the brake plate 120 from rotating with respect to the coil housing 102. In turn, anything connected to the brake plate 120, such as the shift lever 144, is unable to rotate with respect to the brake plate 120. As intended herein, the interface between the brake plate seat 110 and the peripheral outer surface 122 of the brake plate 120 in the locked position is frusto-conical.

However, depressing the brake pedal activates the switch 140 to interrupt the power supply to the coil 118. Consequently, the spring washer 126 biases the magnetic brake 100 to the unlocked position, wherein the brake plate 120 is free to rotate with respect to the coil housing 102.

With the configuration of structure described above, it is to be appreciated that the magnetic brake for a transmission lock 100 provided the necessary force to prevent an automatic transmission 146 from being placed into gear without depressing the brake pedal 140. The shape of the brake plate 120 and the corresponding seat 110 results in a wedging effect when the coil 118 is energized that increases the efficiency of the coil 118 and allows for a relatively small coil 118 that uses relatively little power.

While the particular magnetic brake for a transmission lock as herein shown and described in detail is fully capable of attaining the above-described objects of the invention, it is to be understood that it is the presently preferred embodiment of the present invention and thus, is representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it is to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. section 112, sixth paragraph, unless the element is expressly recited using the phrase "means for."

What is claimed is:

1. An electro-mechanical transmission locking system, comprising:
    a vehicle power supply;
    an ignition switch electrically coupled to the vehicle power supply;
    a brake pedal switch;
    a magnetic brake electrically coupled to the ignition switch and the brake pedal, the magnetic brake defining a frusto-conical locking interface;
    a transmission shift lever mechanically coupled to the magnetic brake; and
    an automatic transmission mechanically coupled to the transmission shift lever.

2. The electro-mechanical transmission locking system of claim 1, wherein the magnetic brake comprises:
    a housing defining an axis and having an end circumscribed by a seat, the seat establishing an oblique angle relative to the axis; and
    a plate forming a peripheral surface complementarily shaped with the seat, the plate being movable between an unlocked position, wherein the plate is distanced from the housing and the plate is able to rotate with respect to the housing, and a locked position, wherein the perimeter surface of the plate engages the seat and the plate is unable to rotate with respect to the housing.

3. The electro-mechanical transmission locking system of claim 2, wherein the magnetic brake further comprises:
    a coil disposed within the housing, the coil being energizable to move the plate from the unlocked position to the locked position.

4. The electro-mechanical transmission locking system of claim 1, wherein the magnetic brake comprises:
    a spring washer biasing the plate toward the unlocked position.

5. The electro-mechanical transmission locking system of claim 2, wherein the oblique angle of the mechanical brake is between ten degrees and fifteen degrees (10°–15°).

6. A magnetic brake for use in an automatic transmission locking system comprising:

a housing having a closed end, an open end, and a continuous side wall therebetween;

a seat circumscribing the open end;

a central post extending from the closed end of the housing, an annular chamber being established between the central post and the side wall;

a plate forming a perimeter surface for engaging the seat, the plate being movable between an unlocked position, wherein the plate is distanced from the housing and the plate is able to rotate with respect to the housing, and a locked position, wherein the perimeter surface of the plate engages the seat and the plate is unable to rotate with respect to the housing; and a coil disposed around the central post within the annular chamber, the coil being energizable to move the plate from the unlocked position to the locked position.

7. The magnetic brake of claim 6, further comprising: a spring washer biasing the plate toward the unlocked position.

8. The magnetic brake of claim 6, wherein the seat forms an oblique angle with an axis defined by the housing.

9. The magnetic brake of claim 8, wherein the oblique angle is between ten degrees and fifteen degrees (10°–15°).

10. A magnetic brake for use in a vehicle transmission lock comprising:

a housing defining an axis and having an end circumscribed by a seat, the seat establishing an oblique angle relative to the axis;

a plate forming a peripheral surface complementarily shaped with the seat, the plate being movable between an unlocked position, wherein the plate is distanced from the housing and the plate is able to rotate with respect to the housing, and a locked position, wherein the perimeter surface of the plate engages the seat and the plate is unable to rotate with respect to the housing;

a coil disposed within the housing, the coil being energizable to move the plate from the unlocked position to the locked position; and a spring washer biasing the plate toward the unlocked position.

11. The magnetic brake of claim 10, wherein the oblique angle is between ten degrees and fifteen degrees (10°–15°).

\* \* \* \* \*